(12) United States Patent
Machui (10) Patent No.: US 6,861,924 B2
(45) Date of Patent: Mar. 1, 2005

(54) DUPLEXER WITH IMPROVED TRANSMISSION/RECEIVING BAND SEPARATION

(75) Inventor: Jürgen Machui, München (DE)

(73) Assignee: EPCOS AG, München (DE)

( * ) Notice: Subject to any disclaimer, the term of this patent is extended or adjusted under 35 U.S.C. 154(b) by 77 days.

(21) Appl. No.: 10/149,828

(22) PCT Filed: Dec. 6, 2000

(86) PCT No.: PCT/DE00/04344
§ 371 (c)(1),
(2), (4) Date: Sep. 16, 2002

(87) PCT Pub. No.: WO01/45273
PCT Pub. Date: Jun. 21, 2001

(65) Prior Publication Data
US 2003/0076194 A1 Apr. 24, 2003

(30) Foreign Application Priority Data
Dec. 14, 1999 (DE) .......... 199 60 299

(51) Int. Cl.[7] .................. H03H 9/72
(52) U.S. Cl. .......... 333/133; 333/193; 310/313 A; 455/78; 455/83
(58) Field of Search .......... 333/133, 193–196; 455/78, 83; 310/313 A, 363, 364

(56) References Cited

U.S. PATENT DOCUMENTS

| 4,980,660 | A | | 12/1990 | Nakamura et al. .......... 333/101 |
| 5,815,804 | A | * | 9/1998 | Newell et al. .......... 455/78 |
| 5,874,869 | A | * | 2/1999 | Ueda et al. .......... 333/193 |
| 5,915,212 | A | | 6/1999 | Przelomiec et al. .......... 455/83 |
| 5,963,856 | A | | 10/1999 | Kim .......... 455/307 |
| 6,115,592 | A | * | 9/2000 | Ueda et al. .......... 455/307 |
| 6,380,823 | B1 | * | 4/2002 | Ikata et al. .......... 333/133 |
| 6,445,262 | B1 | * | 9/2002 | Tanaka et al. .......... 333/133 |
| 6,472,953 | B1 | * | 10/2002 | Sakuragawa et al. .......... 333/133 |
| 6,483,399 | B1 | * | 11/2002 | Atokawa .......... 333/133 |
| 6,525,624 | B1 | * | 2/2003 | Hikita et al. .......... 333/133 |

FOREIGN PATENT DOCUMENTS

| EP | 0 940 914 A1 | * | 9/1999 |
| GB | 2 346 049 A | * | 7/2000 |
| JP | 10-290176 | * | 10/1998 |

* cited by examiner

Primary Examiner—Barbara Summons
(74) Attorney, Agent, or Firm—Schiff Hardin LLP (57) ABSTRACT

In a duplexer for a wireless communication system that comprises a transmission and a reception band, the present invention provides that a split surface wave filter be provided as an input and/or output filter, this split surface wave filter comprising at least two sub-filters that cover neighboring frequency sub-ranges of the corresponding band and supplementing one another to the overall band. At least two pairs of sub-filters are provided that respectively comprise a filter in the input and output filter. Switching between the at least two pairs can be carried out with a switch. Given the same duplexer spacing, a higher band spacing that can be realized with SAW filters is created between transmission and reception band or the corresponding frequency sub-ranges.

5 Claims, 5 Drawing Sheets

DUPLEXER WITH IMPROVED TRANSMISSION/RECEIVING BAND SEPARATION

BACKGROUND OF THE INVENTION

1. Field of the Invention
2. Description of the Related Art

In wireless communication systems, particularly in mobile radiotelephone systems that do not allow time domain duplexing (TDD), two different frequency bands are usually provided that serve as a transmission (Tx) band and a reception (Rx) band from the point of view of the communication participant. A common antenna is used for the transmission and reception of signals on the communication transmission device, particularly in the mobile radiotelephone device (cell phone). A duplexer is generally needed for the separation of transmission and reception signals, this being connected between antenna and transmission and reception path. Such a duplexer is primarily composed of two interconnected filters, namely an Rx filter between the antenna and the Rx path (a low noise amplifier-LNA) for received signals, and a Tx filter between the Tx path (power amplifier-PA) and the antenna for signals to be sent.

Since the communication terminal device must be able to simultaneously transmit and receive, each of the two filters must be able to adequately suppress a signal lying in the other frequency band. Typical values that are required in such wireless communication systems, for example, for the suppression of the Tx band by the Rx filter, lie in the range around 50 dB and above. At the same time, the respective signals must experience only minimal losses when passing through the filter in the respective frequency band. A typical value for a maximally tolerable attenuation of the Tx band in the Tx filter is 2 dB or better.

Known duplexers that meet these high demands made by the requirements for band separation (stop band suppression) and insertion attenuation are constructed, for example, of microwave ceramic filters. Given an adequate band spacing of the Tx and Rx band, surface-active wave filters (SAW filters) can also be employed. When, however, the Tx and Rx bands lie extremely close to one another, it is very difficult or even impossible to simultaneously meet all demands with SAW filters by themselves. One example of such a system is the American CDMA/TDMA-1900 (according to IS-95 or IS-136) in which the transmission and reception band are respectively 60 MHz wide and which provides a duplex spacing (constant spacing between transmission and reception signals) of 80 MHz. Given this bandwidth, a spacing of only 20 MHz remains between the two bands, this corresponding to approximately 10000 PPM for this frequency band. Within only 20 MHz, the respective filter must switch from the pass band with, for example, 2 dB attenuation into the stop band where, for example, the 50 dB attenuation is required. This requires a transmission behavior that exhibits steep signal edges in the pass band. Since a temperature-dependent frequency drift of the filter as well as manufacturing tolerances must also be additionally considered, it was previously not possible to construct such a duplexer only on the basis of the SAW filter technique. This required SAW filters that comprised a pass band with extremely steep signal edges.

SUMMARY OF THE INVENTION

It is therefore an object of the present invention to provide a duplexer for such communication systems that enables the employment of SAW filter techniques and, thus, allows for a miniaturization of duplexers.

This object is achieved with a duplexer for a wireless communication system having a transmission and a reception band, comprising: an input filter configured as a split surface wave filter to receive a reception signal in a reception band, the input filter comprising at least two sub-filters covering neighboring frequency sub-bands of the reception band; an output filter configured as a split surface wave filter to transmit a transmission signal in a transmission band, the output filter comprising at least two sub-filters covering neighboring frequency sub-bands of the transmission band; a first filter pair comprising: a first sub-filter of the at least two sub-filters of the input filter; and a first sub-filter of the at least two sub-filters of the output filter, a first duplexer spacing between the transmission signal and the reception signal being adhered to for all sub-filter pairs; the duplexer further comprising: a second filter pair for a further communication system comprising: a second sub-filter of the at least two sub-filters of the input filter; and a second sub-filter of the at least two sub-filters of the output filter, a second duplexer spacing that differs from the first duplexer spacing being utilized; the duplexer further comprising: switch elements configured to switch between the first filter pair and the second filter pair. Advantageous developments of the invention are described below.

The invention is based on the idea of providing at least one of the filters between the antenna and the Rx path (reception filter) and between the antenna and the Tx path (transmission filter) of at least two sub-filters whose pass bands lie in mutually neighboring frequency sub-ranges of the required transmission or reception band and thereby cover the entire band. These sub-filters may be fashioned as surface-active wave filters and can then be correspondingly narrower-band than the filters previously employed. Each of the two sub-filters, for example, then need only cover half the bandwidth of the corresponding transmission or reception band. The required overall width of the corresponding transmission or reception band derives from the addition of the two frequency sub-ranges.

A better optimization is possible for a narrow-band SAW filter, this particularly enabling the formation of steeper signal edges in the pass band. A better separation of the bands is already possible with only one signal edge improved in steepness insofar as this delimits the corresponding transmission or reception band from the neighboring reception or, respectively, transmission band. The split filter can thus be fashioned as a SAW filter, which was previously not possible because of the signal edges that could not be set steeply enough and because of the slight band spacing. With the steeper signal edges of the sub-filters, the invention also enables a better suppression of the respective other band (transmission or reception band) of 50 dB and more. Additionally, the use of SAW filters eliminates the matching required for setting the frequency position given traditional duplexers of microwave ceramic (MWK).

Preferably, both input filters as well as output filters are fashioned as split surface wave filters. The inventive duplexers are thus completely composed of SAW filters in order to completely exploit the advantages of SAW filters compared to traditional MWK filters or duplexers. In particular, a further miniaturization is possible with a duplexer composed only of SAW filters, this enabling a further miniaturization of the corresponding terminal devices in which the inventive duplexer is employed. Since sub-filters for frequency sub-ranges that are narrower than the overall band are provided in the transmission and in the reception band, a suppression of the respectively other band or frequency sub-range is possible in a simpler way. When, for example, input and output filters having a bandwidth of 60 MHz were employed for the American CDMA-1900 system, then a maximum spacing of 20 MHz remained given a duplex spacing of 80 MHz between the two bands (frequency ranges). Inventively, a spacing of 50 MHz is now possible with input and output filters split into at least two sub-filters. Even given non-optimum signal edges of the corresponding pass bands, a better suppression of the respectively other band can thus be achieved. A one-chip solution for all filters of the duplexer also becomes possible due to the structuring using only SAW filters.

In the inventive duplexer, moreover, switches can be provided for switching between the sub-filters and, thus, for switching between the frequency sub-ranges. Due to the provision of a switch, respectively only one of the sub-filters of the split SAW filter is always connected to the antenna, so that the other sub-filter or sub-filters do not disturb the properties of the "active" sub-filter. It is thus also possible to optimize the sub-filters independently of one another to a suitable frequency position and a suitable edge steepness. When input and output filters are fashioned as split SAW filters, then a sub-filter of the output filter is allocated to each sub-filter of the input filter, these together forming a sub-filter pair. With the assistance of a shared switch or two individual switches, a switch can then be synchronously undertaken from an active to a previously passive, further sub-filter pair. The subfilter pairs are allocated to the frequency sub-ranges such that the duplexer spacing is adhered to. Usually, the frequency positions of the sub-filters in the input filter and in the output filter are respectively shifted by the same amount. This shift always ensues in pairs.

In another advantageous development, the duplexer is fashioned for transmission and reception within at least two different communication systems that use different frequency bands. This is achieved in a simple way in that the plurality input and output filters and the appertaining switches are correspondingly multiplied. A separate set of input and output filters and the appertaining switches is provided for each communication system for which the inventive duplexer is designed. For example, terminal devices that are provided for utilization in two different communication systems (dual band cell phones) are already known, as is employing separate duplexers for each of the systems. Inventively, it is also possible to design one duplexer for more than two communication systems.

In a further development of the invention, one switch can switch both between sub-filter pairs within a communication system as well as between sub-filter pairs that belong to two different communication systems. The duplex spacing can also vary and, thus, so can the spacing between the frequency sub-ranges of the sub-filter pairs. When the two communication systems are present in parallel to one another and exhibit different degrees of coverage, a better network coverage is then possible for a communication terminal device using the inventive duplexer. When different communication systems are used in different countries, then a correspondingly equipped communication terminal device can be used in both systems in cross-border fashion. A common advantage is that only one duplexer is required for the different communication systems. A splitting of the input and/or output filters into two or even more sub-filters can be undertaken in both communication system systems. However, it is also possible that one communication system exhibits an adequately high duplex spacing that can be realized with the assistance of respectively one SAW filter for the input and output filter. An inventive duplexer may also comprise, in combination with a communication system that comprises split input and/or output filters, a switching possibility between at least three pairs of filters, where at least two subfilter pairs are on an SAW base.

Preferably, all input and output filters of the duplexer and, potentially, the additional switches are arranged in a common housing or at least on a common module. This is easier to handle for the manufacturer of the terminal device and can be more simply optimized for terms of its properties.

Preferably, an inventive duplexer is constructed only of surface wave filters for the reception band and the transmission band, all of these being integrated on a shared piezoelectric substrate or being arranged on two substrates. Due to the high integration density that is possible in this configuration, the highest degree of miniaturization for the duplexer can thus be achieved with the first-cited embodiment. Furthermore, on a shared substrate, the shared employment of other circuit and network components is also possible for the different filters, this yielding a further enhancement of the integration density. Additionally, a simplified adaptation of the filters to one another and to a network is also possible on the common substrate.

It is also possible to integrate all filters and sub-filters together with a potentially required matching network of passive components and the switches on a shared module. This also simplifies the manipulation and simplifies the employment since the manufacturers of the terminal devices need process only one module.

Lithium tantalate rot-y having a section angle of 35 through 46° (LT35–46) is preferred for the surface wave filter and SAW sub-filters. This material has an especially good temperature response with which a transmission behavior having narrow band widths and steep signal edges can be set.

Since, due to the higher spacing between the frequency sub-ranges, signal edges that are not as steep also lead to the desired decoupling between the transmission and reception bands given the inventive duplexer, the employment of lithium niobate rot-y fedy having a section angle of 60–70° (LN60–70) and, in particular, close to 64° (LN64) is fundamentally also possible. Even lower insertion attenuations can thus be achieved compared to lithium tantalate. This can be particularly advantageous given the employment of lithium niobate for the output filters, since a high transmission power is desired particularly given a communication terminal device which requires internally a low insertion attenuation. Given an unchanging transmission power, a lower insertion attenuation results in a lower power consumption.

It is also possible to provide SAW filters for input and output filters that are constructed on different substrate materials. The combination lithium niobate for the output filter and lithium tantalate for the input filter is preferred in this situation.

In order to achieve the good filter properties, the electrode material is preferably correspondingly power-resistant. Electrodes that comprise the following layers of material or a sandwich structure having the following combinations of material layers are therefore well-suited: aluminum and copper layers, aluminum and magnesium layers or aluminum/copper and copper or magnesium layers.

An approved power compatibility is also achieved when the layer comprising titanium is provided between electrode material and substrate, particularly a titanium layer.

The surface wave filters of the inventive duplexer are preferably fashioned as reactance filters, with which the required high insertion attenuation can be easily achieved, particularly at the output filter.

DESCRIPTION OF THE DRAWINGS

The invention is explained in greater detail below on the basis of exemplary embodiments and the appertaining nine figures.

FIGS. 4 through 6 are schematic block diagrams showing various integration units of a duplexer together with periphery;

Figure 1:
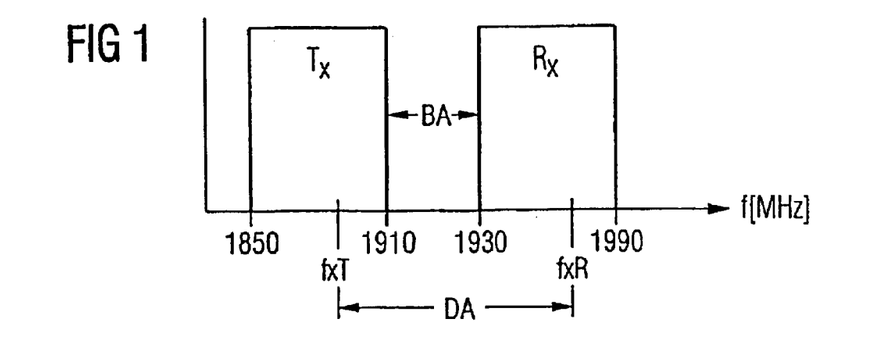
FIG. 1 is a frequency graph showing the position and arrangement of transmission and reception band.

In a schematic illustration, FIG. 1 shows the arrangement and position of transmission band Tx and reception band Rx of the American CDMA-1900 system. The transmission band Tx extends from 1850 through 1910 MHz and is thus 60 MHz wide. The reception band Rx extends from 1930 through 1990 MHz and thus likewise has a width of 60 MHz. A communication connection—as viewed proceeding from the communication terminal device—uses, for example, a transmission frequency fxT that lies in the transmission band Tx and, simultaneously, uses a reception frequency fxR in the reception band Rx. The spacing between fxT and fxR is what is referred to as the duplex spacing DA and amounts to 80 MHz for this CDMA system. For a communication connection within this system, all frequency pairs having the duplex spacing 80 MHz are suitable. The spacing BA between the transmission Tx and the reception band Rx amounts to 20 MHz.

Figure 2:
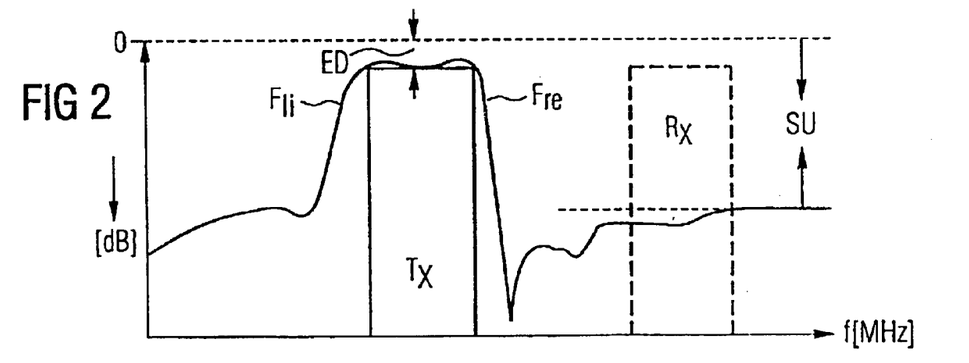
FIG. 2 is a frequency graph showing a real filter curve.

In a schematic illustration, FIG. 2 shows a possible band pass curve of a filter with the required bandwidth entered below—here the transmission band Tx. What is decisive for the filter quality is, in particular, the insertion attenuation ED. Within the corresponding band, the insertion attenuation ED is the greatest spacing from the broken-line zero line for zero attenuation relative to the pass curve. Usually, the pass range is also wider than the required frequency range of the respective band, since the signal edges of a filter cannot be vertically set in the pass band. Given the pass curve shown in the figure for a transmission filter, the right-hand edge Fre is critical, this limiting the passband relative to the neighboring frequency range of the reception band Rx. This edge must be steep enough so that the input filter here exhibits an adequately low sensitivity or an adequately high stop band suppression SU in the region of the reception band Rx. For a corresponding input filter, the left-hand edge Fli of the passband will be critical, this limiting the reception band Rx relative to the transmission band Tx.

Figure 3:
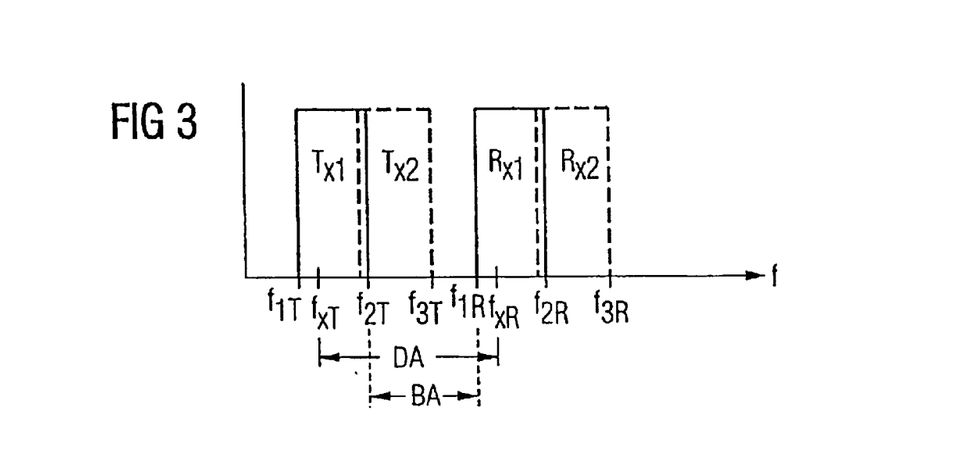
FIG. 3 is a frequency graph showing the arrangement and position of frequency sub-ranges according to the invention.

FIG. 3 shows how the transmission and reception ranges Tx, Rx are inventively split into respectively two frequency subranges having what is an identical bandwidth. A frequency sub-range Rx1, Rx2 of the reception band is respectively allocated to a frequency sub-range Tx1, Tx2 of the transmission band such that the duplex spacing DA can be adhered to. For example, a transmission frequency fxT has a reception frequency fxR allocated to it in the required duplex spacing DA of, for example, 80 MHz. Whereas the spacing BA between transmission and reception band in known duplexers corresponds to the spacing f1R–f3T, it amounts to f1R–f2T=f2R–f3T=50 MHz (for the CDMA system) given the inventively split transmission or reception bands or appertaining filters. The filters belonging to the corresponding frequency sub-ranges exhibit a passband in the corresponding frequency sub-ranges. Due to the higher band spacing BA, however, filters having less steep edges can be selected for this purpose, these nonetheless achieving the required stop band suppression SU of, typically, 50 dB.

In addition to the division of transmission or reception band into two frequency sub-ranges Tx1, Tx2; Rx1, Rx2 shown here, it is also possible to divide the corresponding bands into three and more frequency sub-ranges, where a separate sub-filter is provided for each frequency sub-range.

Figure 4:
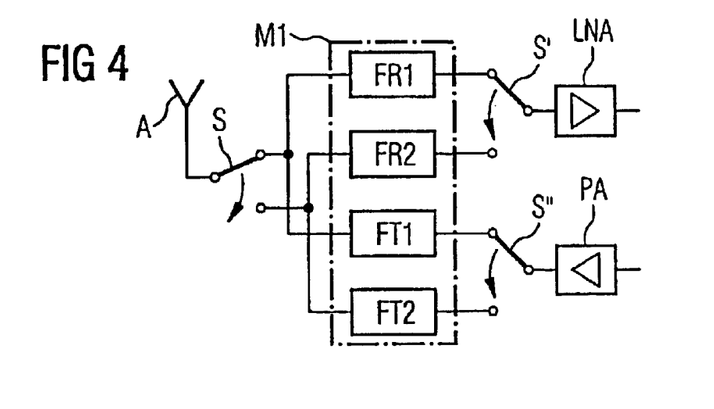
FIG. 4 is a schematic block diagram of a duplexer module comprising four sub-filters.

In a schematic illustration, FIG. 4 shows a duplexer composed of four sub-filters FR1, FR2, FT1, FT2 together with an interconnection to an antenna A and the appertaining transmission path PA and reception path LNA. Both the input filter as well as the output filter are fashioned as split surface wave filters each having two sub-filters. The input filter comprises the sub-filters FR1 and FR2, whereas the output filter comprises the sub-filters FT1 and FT2. A switch S that can switch between two sub-filter pairs FT1/FR1 and FT2/FR2 is arranged between the antenna A and the duplexer composed of the four su-filters. A sub-filter pair respectively comprises a filter composed of an input and an output filter, for example the pair FR1/FT1 or FR1/FT2. Further switches S', S" connect, for example, the components of the reception path LNA to the input filter, whereby the switch S' switches between the sub-filters of the input filter. Correspondingly, the switch S" switches between the various output filters FT1 and FT2 that are optionally connected to the components of the transmission path PA. The broken line illustrates a module M1 on which the four subfilters are integrated. The matching network composed, for example, of passive components such as resistors, capacitors and inductances or striplines (not shown in the Figure) is realized outside the module, as are the switches S.

Figure 5:
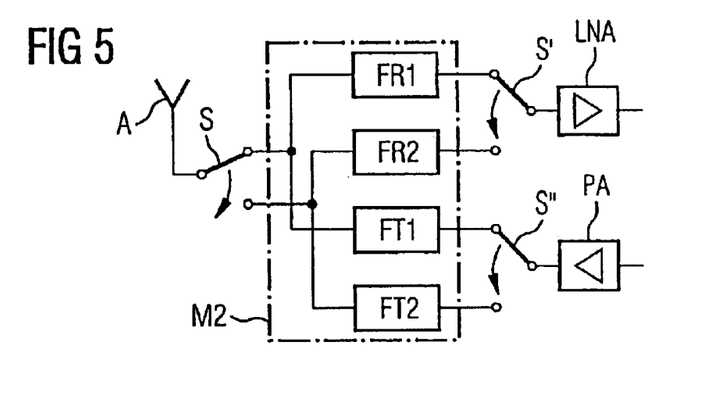
FIG. 5 is a schematic block diagram of the duplexer module as show in FIG. 4, but further enveloping an additionally integrated matching network.

FIG. 5 shows a corresponding arrangement in which the matching network is also additionally integrated on an enlarged module M2 in addition to the sub-filters.

Figure 6:
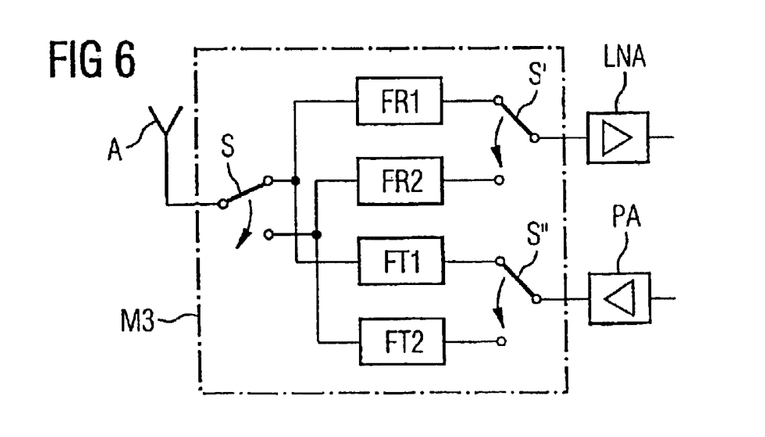
FIG. 6 is a schematic block diagram of the duplexer module as shown in FIG. 4, but further enveloping the matching network and switches.

An even more highly integrated module M3 is shown in FIG. 6. This module M3 also comprises the matching network and the switches S in addition to comprising the sub-filters.

Figure 7:
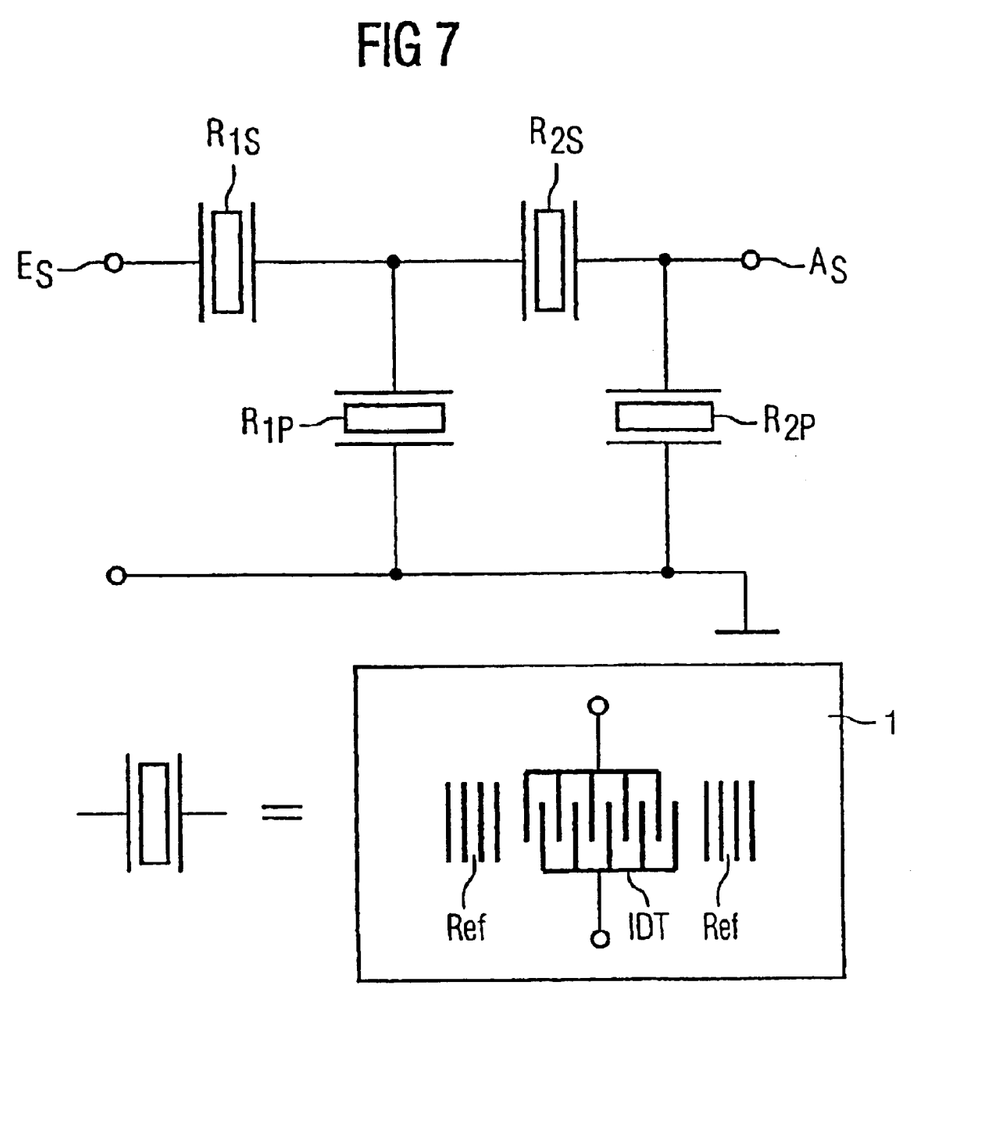
FIG. 7 is a schematic block diagram showing an exemplary interconnection of one-port resonators to form a reactance filter.
Figure 8:
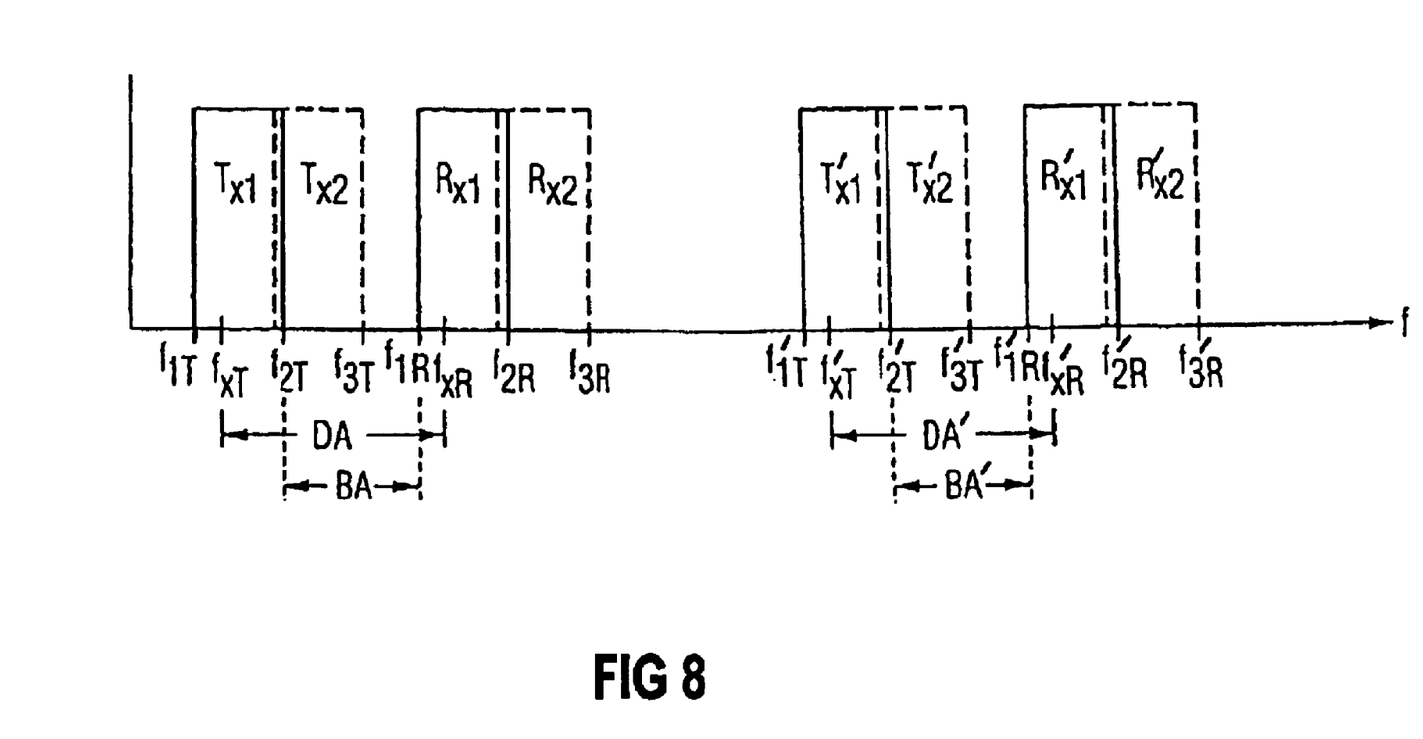
FIG. 8 is a frequency graph showing the arrangement and position of frequency sub-ranges in a second duplexer for sending and receiving in a second communications system.
Figure 9:
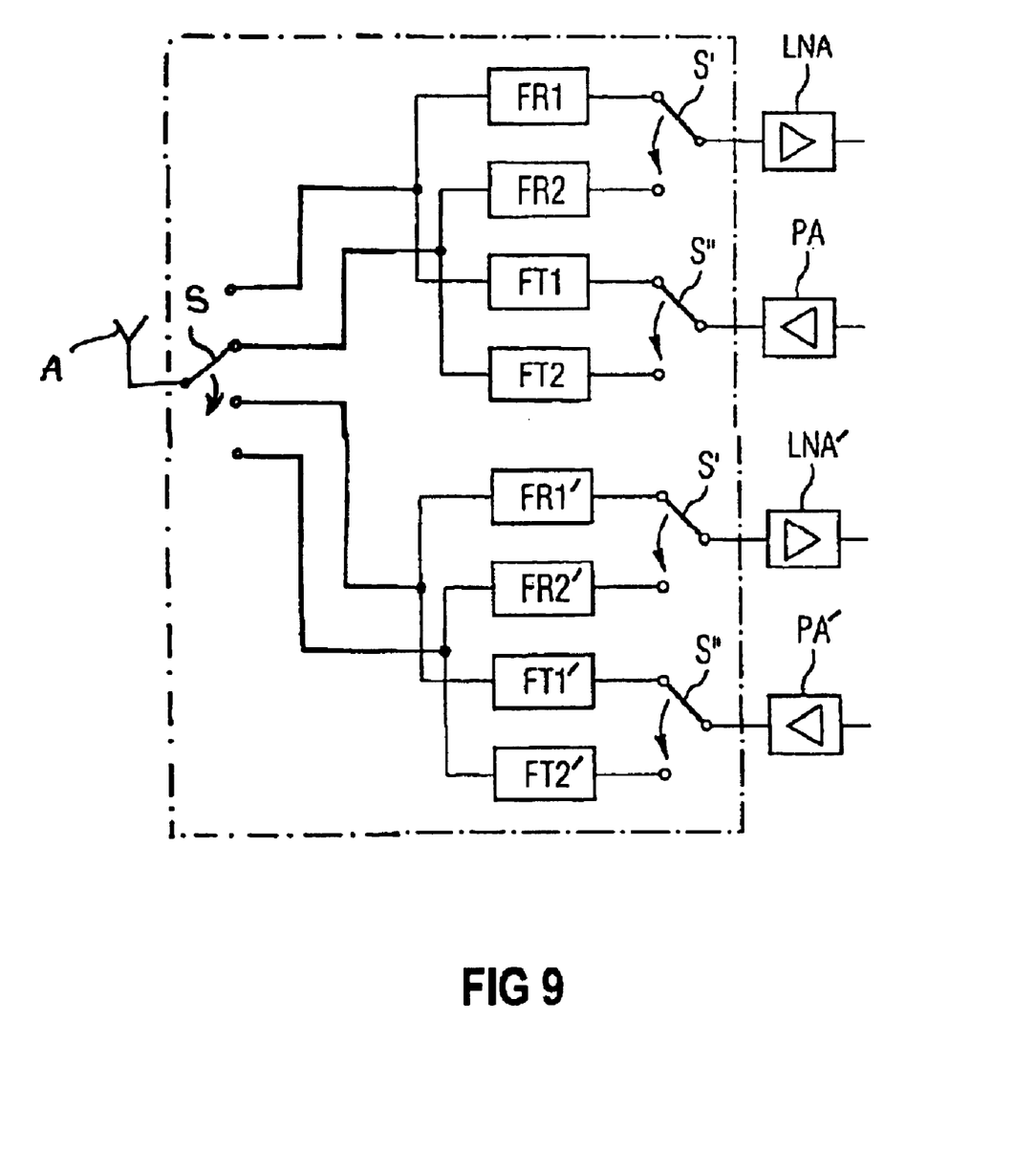
FIG. 9 is a schematic block diagram of the duplexer module as show in FIG. 5, but further enveloping an additional duplexer for a second communication system.

In a schematic illustration, FIG. 7 shows a circuit arrangement for a reactance filter composed of surface wave one-port resonators. An SAW one-port resonator is constructed on a piezoelectric substrate 1 and comprises an interdigital transducer IDT provided with two terminals that is arranged between two reflectors Ref. For a simple reactance filter, at least two such one-port resonators are then interconnected such that at least one of the resonators is serially arranged between input ES and output AS and at least one of the resonators is connected to the ground in a parallel branch. Together with a neighboring, parallel resonator R1P, a serial resonator (for example, R1S) forms a basic element of a reactance filter. A reactance filter, however, is preferably composed of a plurality of series-connected basic elements, for example, of three basic elements as shown in FIG. 7. In the exemplary embodiment, the resonators R2S and R1P as well as R2S and R2P form two further basic elements. Within a basic element, the resonant frequencies of parallel and serial resonator are shifted relative to one another such that the anti-resonant frequency of the serial resonator comes to lie exactly on the resonant frequency of the parallel resonator. This filter exhibits a pass behavior with a pass band that exhibits an especially low insertion attenuation of, for example, 2 dB and less.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components (where one of skill in the art would utilize them) configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

List of Reference Characters
Tx transmission band
Rx reception band
SU stop band suppression
ED insertion attenuation
fxT transmission frequency
fxR reception frequency
Fli Fre left and right edge of the pass band
Tx1, Tx2 frequency sub-ranges of the transmission band
Rx1, Rx2 frequency sub-ranges of the reception band
FR1, FR2 sub-filters of the split input filter
of the split output filter
A antenna
S, S', S" switches
LNA low noise amplifier of the Rx path
PA power amplifier of the Tx path
M1, M2, M3 modules
R1S, R2P one-port resonators in the serial branch
R1P, R2P one-port resonators in the parallel branch
ES serial branch input
AS serial branch output
REC reflector
IDT interdigital transducer

What is claimed is:

1. A duplexer device comprising a plurality of duplexers for wireless communication systems, the communication systems using different frequency bands, each communication system being characterized by its transmission band, reception band and duplexer spacing, wherein each duplexer is configured for sending and receiving in a respective communication system, wherein the reception band is divided into a number N>1 of reception sub-bands;

the transmission band is divided into a number N>1 of transmission sub-bands;

a i-th sub-band pair comprises a i-th reception and a i-th transmission sub-band, i being an ordinal number from 1 to N;

in all sub-band pairs the central frequencies of the i-th reception and the i-th transmission sub-band are separated by the duplexer spacing;

the duplexer comprising:

a reception band filter comprising N reception sub-filters;

a transmission band filter comprising N transmission sub-filters;

N reception sub-paths and N reception sub-filters, the i-th reception sub-filter arranged in the i-th reception sub-path, the pass-band of the i-th reception sub-filter being the i-th reception sub-band.

N transmission sub-paths and N transmission sub-filters, the i-th transmission sub-filter arranged in the i-th transmission sub-path, the pass-band of the i-th transmission sub-filter being the i-th transmission sub-band;

N filter pairs, a i-th filter pair comprising the i-th reception and the i-th transmission sub-filter; and switch elements configured to switch between the N filter pairs;

wherein the i-th reception and the i-th transmission sub-path are connected in parallel on the antenna side; and wherein in at least one filter of the reception band filter and the transmission band filter the corresponding sub-filters are SAW-filters realized on a common piezoelectric substrate.

2. A duplexer for a wireless communication system having a transmission band and a reception band, the communication system having a duplexer spacing, wherein:

the reception band is divided into a number N>1 of reception sub-bands;

the transmission band is divided into a number N>1 of transmission sub-bands;

a i-th sub-band pair comprises a i-th reception and a i-th transmission sub-band, i being an ordinal number from 1 to N;

in all sub-band pairs the central frequencies of the i-th reception and the i-th transmission sub-band are separated by the duplexer spacing;

the duplexer comprising:

a reception band filter comprising N reception sub-filters;

a transmission band filter comprising N transmission sub-filters;

N reception sub-paths and N reception sub-filters, the i-th reception sub-filter arranged in the i-th reception sub-path, the pass-band of the i-th reception sub-filter being the i-th reception sub-band, N transmission sub-paths and N transmission sub-filters, the i-th transmission sub-filter arranged in the i-th transmission sub-path, the pass-band of the i-th transmission sub-filter being the i-th transmission sub-band;

N filter pairs, a i-th filter pair comprising the i-th reception and the i-th transmission sub-filter; and switch elements configured to switch between the N filter pairs;

wherein the i-th reception and the i-th transmission sub-path are connected in parallel on the antenna side;

wherein in at least one filter of the reception band filter and the transmission band filter the corresponding sub-filters are SAW-filters realized on a common piezoelectric substrate;

the duplexer further comprising a common housing in which all filters and all switches are arranged.

3. A duplexer for a wireless communication system having a transmission band and a reception band, the communication system having a duplexer spacing, wherein;

the reception band is divided into a number N>1 of reception sub-bands;

the transmission band is divided into a number N>1 of transmission sub-bands;

a i-th sub-band pair comprises a i-th reception and a i-th transmission sub-band, i being an ordinal number from 1 to N;

in all sub-band pairs the central frequencies of the i-th reception and the i-th transmission sub-band are separated by the duplexer spacing;

the duplexer comprising:

a reception band filter comprising N reception sub-filters;

a transmission band filter comprising N transmission sub-filters;

N reception sub-paths and N reception sub-filters, the i-th reception sub-filter arranged in the i-th reception sub-path, the pass-band of the i-th reception sub-filter being the i-th reception sub-band, N transmission sub-paths and N transmission sub-filters, the i-th transmission sub-filter arranged in the i-th transmission sub-path, the pass-band of the i-th transmission sub-filter being the i-th transmission sub-band;

N filter pairs, a i-th filter pair comprising the i-th reception and the i-th transmission sub-filter; and switch elements configured to switch between the N filter pairs;

wherein the i-th reception and the i-th transmission sub-path are connected in parallel on the antenna side;

wherein in at least one filter of the reception band filter and the transmission band filter the corresponding sub-filters are SAW-filters realized on a common piezoelectric substrate;

the duplexer further comprising a common module on which a matching network and all existing filters or sub-filters are integrated.

4. A duplexer for a wireless communication system having a transmission band and a reception band, the communication system having a duplexer spacing, wherein:

the reception band is divided into a number N>1 of reception sub-bands;

the transmission band is divided into a number N>1 of transmission sub-bands;

a i-th sub-band pair comprises a i-th reception and a i-th transmission sub-band, i being an ordinal number from 1 to N;

in all sub-band pairs the central frequencies of the i-th reception and the i-th transmission sub-band are separated by the duplexer spacing;

the duplexer comprising:

a reception band filter comprising N reception sub-filters;

a transmission band filter comprising N transmission sub-filters;

N reception sub-paths and N reception sub-filters, the i-th reception sub-filter arranged in the i-th reception sub-path, the pass-band of the i-th reception sub-filter being the i-th reception sub-band, N transmission sub-paths and N transmission sub-filters, the i-th transmission sub-filter arranged in the i-th transmission sub-path, the pass-band of the i-th transmission sub-filter being the i-th transmission sub-band;

N filter pairs, a i-th filter pair comprising the i-th reception and the i-th transmission sub-filter; and switch elements configured to switch between the N filter pairs;

wherein the i-th reception and the i-th transmission sub-path are connected in parallel on the antenna side;

wherein in at least one filter of the reception band filter and the transmission band filter the corresponding sub-filters are SAW-filters realized on a common piezoelectric substrate;

the duplexer further comprising a common substrate upon which the switch elements are arranged with all filters.

5. A duplexer for a wireless communication system having a transmission band and a reception band, the communication system having a duplexer spacing, wherein:

the reception band is divided into a number N>1 of reception sub-bands;

the transmission band is divided into a number N>1 of transmission sub-bands;

a i-th sub-band pair comprises a i-th reception and a i-th transmission sub-band, i being an ordinal number from 1 to N;

in all sub-band pairs the central frequencies of the i-th reception and the i-th transmission sub-band are separated by the duplexer spacing;

the duplexer comprising:

a reception band filter comprising N reception sub-filters;

a transmission band filter comprising N transmission sub-filters;

N reception sub-paths and N reception sub-filters, the i-th reception sub-filter arranged in the i-th reception sub-path, the pass-band of the i-th reception sub-filter being the i-th reception sub-band, N transmission sub-paths and N transmission sub-filters, the i-th transmission sub-filter arranged in the i-th transmission sub-path, the pass-band of the i-th transmission sub-filter being the i-th transmission sub-band;

N filter pairs, a i-th filter pair comprising the i-th reception and the i-th transmission sub-filter; and switch elements configured to switch between the N filter pairs;

wherein the i-th reception and the i-th transmission sub-path are connected in parallel on the antenna side;

wherein in at least one filter of the reception band filter and the transmission band filter the corresponding sub-filters are SAW-filters realized on a common piezo-electric substrate;

wherein a substrate material of at least one of the reception band and the transmission band filter comprises lithium tantalate rot-y with a section angle of 35 through 44° —LT35–44; and wherein the substrate material for the transmission band filter comprises LT35–44 and the substrate material for the reception band filter comprises LN60–70.

* * * * *